(12) United States Patent
Lee et al.

(10) Patent No.: US 7,318,734 B2
(45) Date of Patent: Jan. 15, 2008

(54) SWITCHING TERMINAL AND METHOD FOR MAKING THE SAME

(75) Inventors: Chun Ta Lee, Tu-chen (TW); Zhi Jian Chen, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 66 days.

(21) Appl. No.: 10/807,213

(22) Filed: Mar. 22, 2004

(65) Prior Publication Data

US 2004/0183631 A1    Sep. 23, 2004

(30) Foreign Application Priority Data

Mar. 21, 2003   (TW) .............................. 92106301 A

(51) Int. Cl.
*H01R 29/00*        (2006.01)

(52) U.S. Cl. ...................... 439/188; 439/516

(58) Field of Classification Search ................ 439/885, 439/188, 856, 516, 862, 626, 629–631; 29/882–884; 200/283

See application file for complete search history.

(56) References Cited

U.S. PATENT DOCUMENTS

| 4,388,757 | A | * | 6/1983 | Takeyama et al. ............. 29/882 |
| 4,887,347 | A | * | 12/1989 | Hikita .......................... 29/883 |
| 5,860,821 | A | * | 1/1999 | Pernet ......................... 439/188 |
| 6,086,425 | A |   | 7/2000 | Lescoat |
| 6,086,426 | A |   | 7/2000 | Chang |
| 6,186,843 | B1 | * | 2/2001 | Chen et al. .................. 439/885 |

* cited by examiner

*Primary Examiner*—Felix Figueroa
(74) *Attorney, Agent, or Firm*—Wei Te Chung

(57) ABSTRACT

A switching terminal (1) applied to a detecting equipment includes a carrier strip (10), a movable terminal (13) and a stationary terminal (12) respectively extending from a common edge of the carrier strip; Each of the movable terminal and the stationary terminal has a retaining portion (122, 132), a base section (121, 131) and a contact section (123, 133) connecting to the base, The base section 132 of movable terminal defines a cutout (1324) on an edge thereof adjacent to the stationary terminal.

14 Claims, 4 Drawing Sheets

SWITCHING TERMINAL AND METHOD FOR MAKING THE SAME

BACKGROUND OF THE INVENTION

1. Field of the Invention

The present invention relates to a switching terminal and a method for making the same, and particularly to a switching terminal applied to a detecting equipment of a card connector.

2. Description of Related Art

A conventional card connector includes a detecting means for detecting connecting state between a card and the card connector. U.S. Pat. No. 6,086,426 discloses such a detecting equipment of a card connector including a movable terminal and a stationary terminal separated from each other before a card is inserted therein. During the insertion of the card, the card engages with the movable terminal and pushes it to contact to the stationary terminal.

However, the detecting equipment including two terminals separated from each other is mounted in a sidewall, and a first contact section of the stationary terminal is overlap with a second contact section of the movable terminal. Therefore the two terminals need to be pressed by two dies respectively and then mount on the end wall, thereby resulting in additional pressing steps and increasing the cost of manufacture.

Hence, an improved switching terminal and a method for making the same are desired to overcome the disadvantages and problems of the prior art.

SUMMARY OF THE INVENTION

A main object of this invention is to provide a method for making a switching terminal with decreasing steps.

Another object of the present invention is to provide a switching terminal for saving the materials and decreasing the cost of manufacture.

In order to achieve the object set forth, a switching terminal in accordance with the present invention comprises a carrier strip, a movable terminal and a stationary terminal respectively extending from the carrier strip. Each of the movable terminal and the stationary terminal has a retaining portion, a base section and a contact section connecting to the base section. The base section of movable terminal defines a cutout on an edge thereof adjacent to the stationary terminal.

A method of making the switching terminal has following steps:
(1) pressing the movable terminal and the stationary terminal on the carrier strip;
(2) inwardly bending the contact section of the movable terminal at the cutout, until the contact section of the movable terminal and that of the stationary terminal overlap.

Other objects, advantages and novel features of the invention will become more apparent from the following detailed description when taken in conjunction with the accompanying drawings.

DETAILED DESCRIPTION OF THE INVENTION

Figure 1:
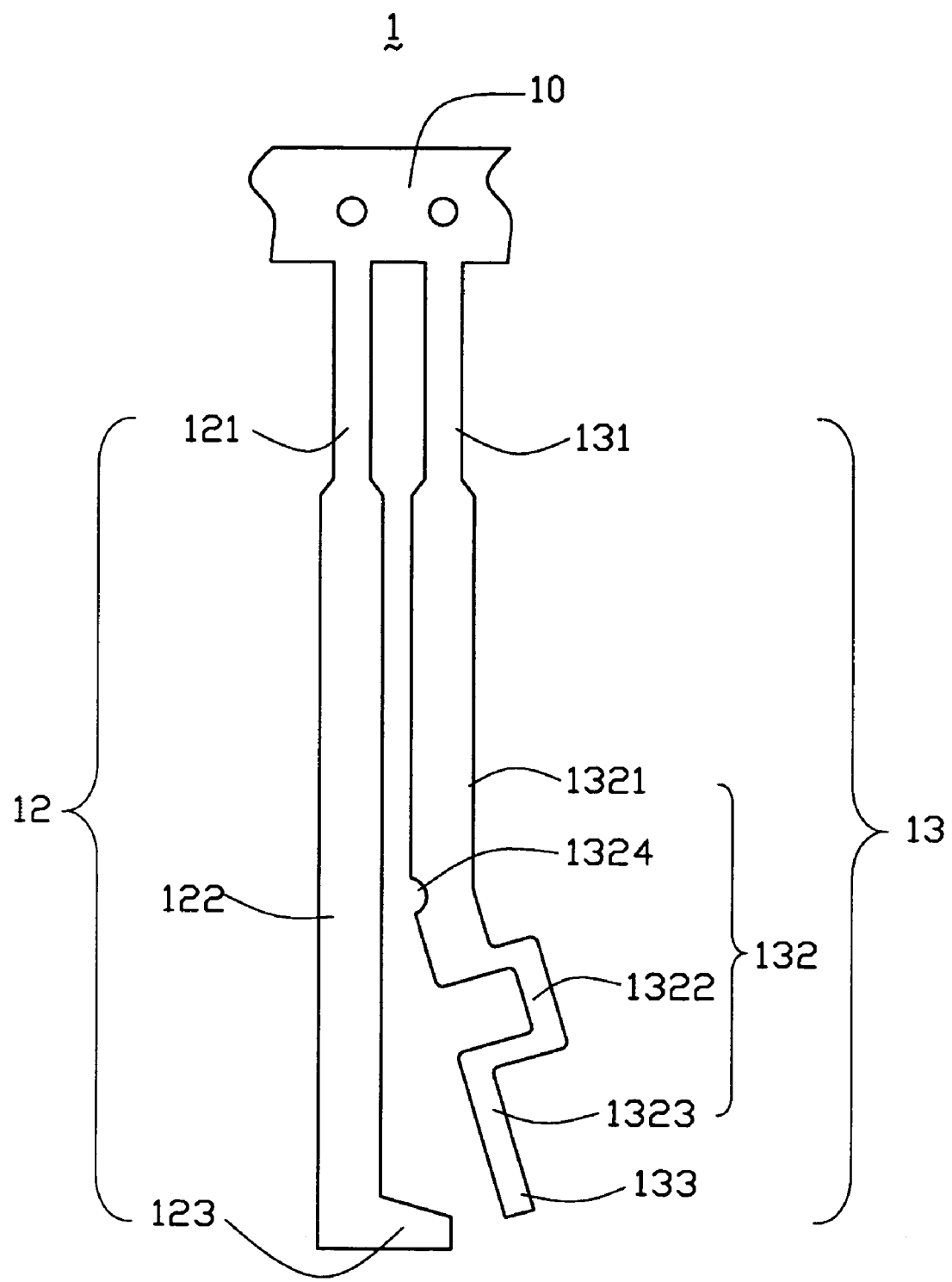
FIG. 1 is a top view of a switching terminal before performing a subsequent bending operation.
Figure 2:
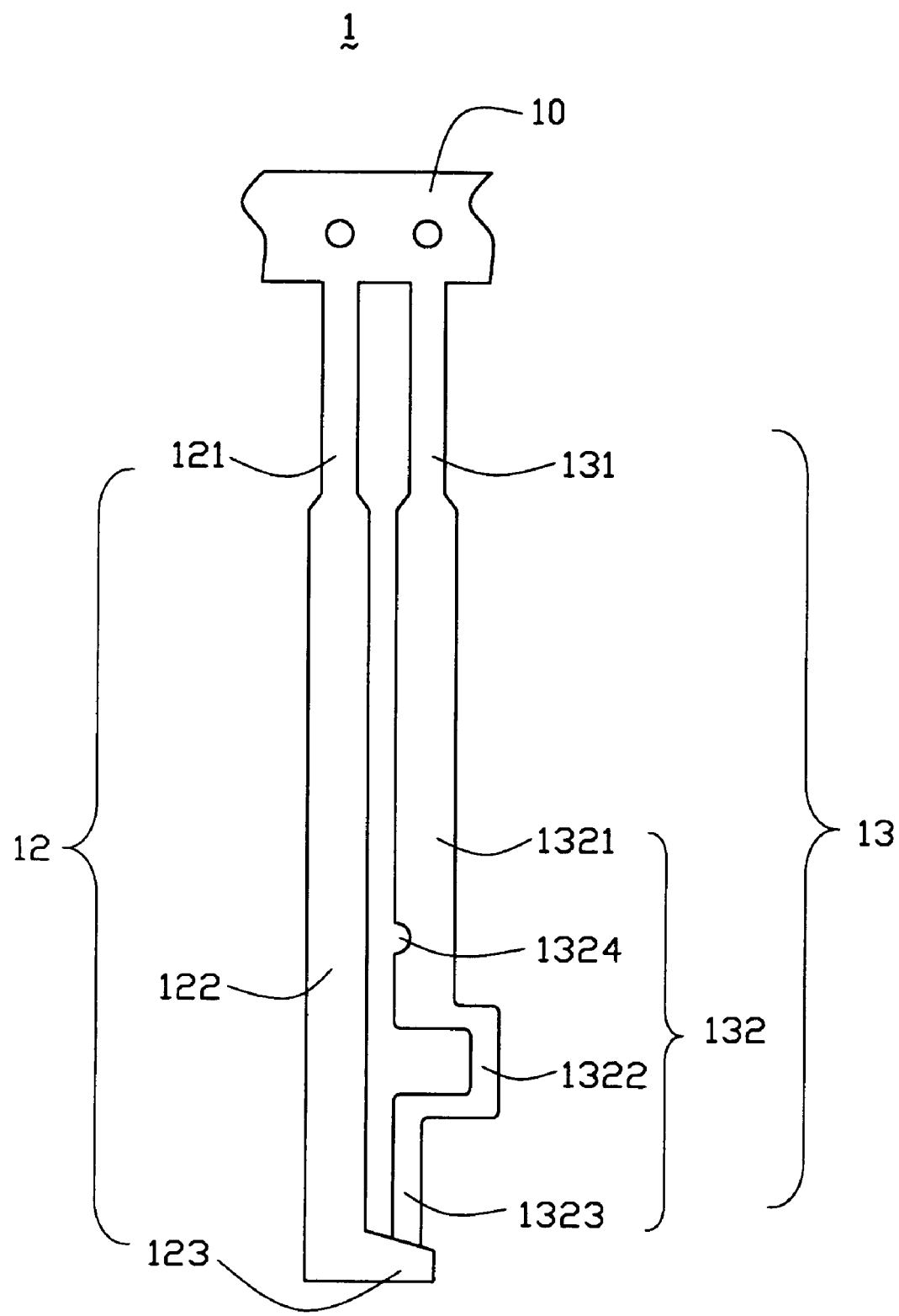
FIG. 2 is a top view of the switching terminal after performing a subsequent bending operation.
Figure 3:
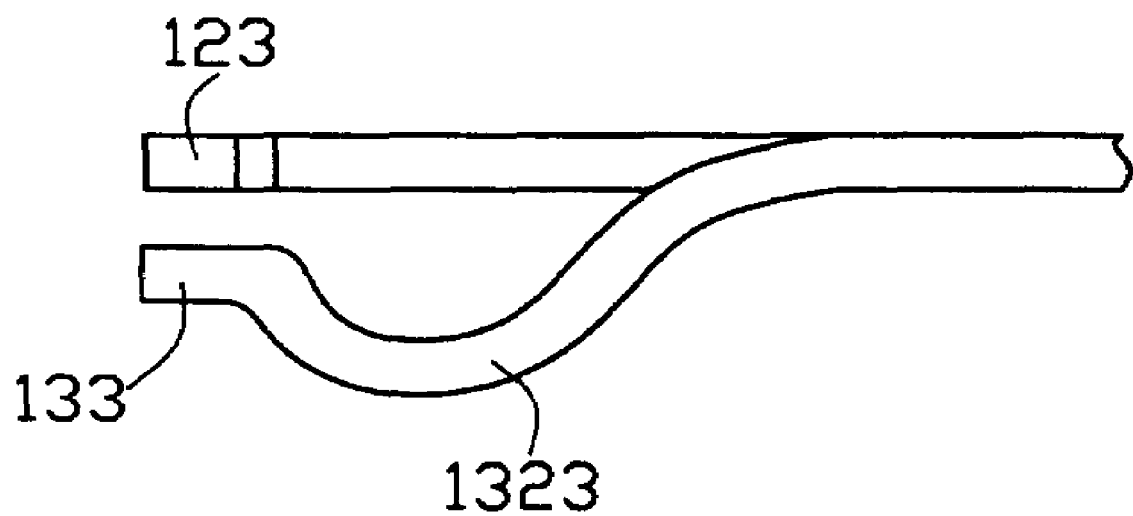
FIG. 3 is a partial side view of the switching terminal.

Referring to FIGS. 1, 2 and 3, a switching terminal 1 in accordance with the present invention, comprises a carrier strip 10, a movable terminal 13 and a stationary terminal 12 respectively extending from a common edge of the carrier strip 10. The stationary terminal 12 has a first retaining portion 121, a first base section 122 and a first contact section 123 connecting to the first base section 122. One end of the first retaining portion 121 connects to the carrier strip 10, and the other end of the first retaining portion 121 connects with the first base section 122. The first base section 122 is slightly wider than the first retaining portion 121. The first contact section 123 extends perpendicularly from the first base section 122 to the movable terminal 13.

Figure 4:
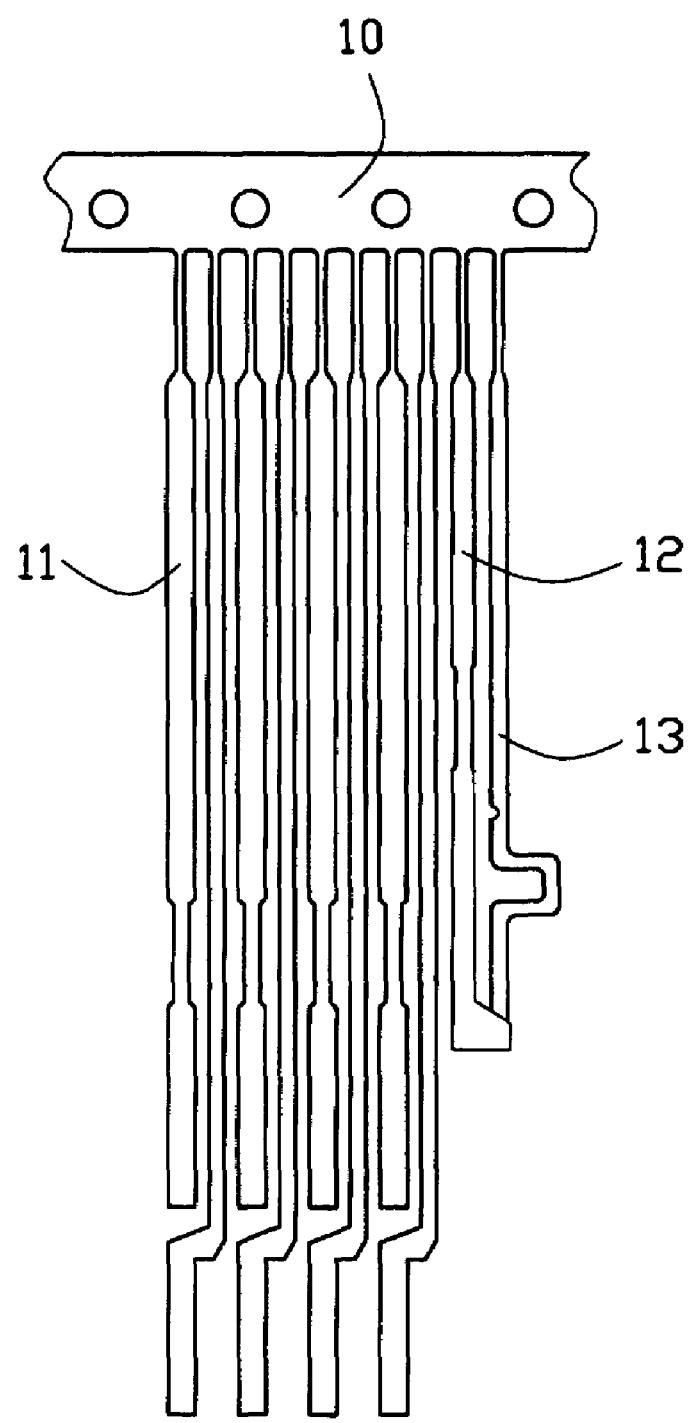
FIG. 4 is a top view of the switching terminal after bending operation, together with some signal terminals.

Referring to FIG. 4, in the process of manufacture, the carrier strip 10 defines a plurality of signal terminals 11 extending from the edge thereof and paralleling to the stationary terminal 12. In assembly, the stationary terminal 12, the movable terminal 13 and the signal terminals 11 can be received card connector at the same time.

Referring to FIGS. 1, 2 and 3, the movable terminal 13 has a second retaining portion 131, a second base section 132 and a second contact section 133 connecting to the second base section 132. One end of the second retaining portion 131 connects to the carrier strip 10, and the other end of the second retaining portion 131 connects with the second base section 132. The second base section 132 is slightly wider than the second retaining portion 131. The second base section 132 comprises a transfiguration portion 1321, a pressing portion 1323 and an angled portion 1322 interconnecting the transfiguration portion 1321 and the pressing portion 1323. The transfiguration portion 1321 defines a semicircular cutout 1324 on an edge thereof adjacent to the stationary terminal 12. The transfiguration portion 1321 is deflected outwardly from the position of the cutout 1324, then it is bended inwardly until the second base section 132 presents linear and parallels to the immobile terminal 12. The pressing portion 1323 presents an arc configuration in a second plane perpendicular to a first plane in which the stationary terminal 12 and the second retaining portion 131 are arranged. The second contact section 133 extends from the pressing portion 1323 and locates in a third plane parallel to the first plane.

The first contact section 123 overlaps with the second contact section 133 and remains untouched with the second contact section 133 originally until the second contact section 133 is urged to deflect from the original position.

A method of making the switching terminal 1 has following steps:
(1) pressing the switching terminal 1 on the carrier strip 10, wherein the second retaining portion 131 is parallel to the stationary terminal 12, and the second base section 132 and the second contact section 133 deflect from the second retaining portion 131 at the position of the semicircular cutout 1324 and extend away from the stationary terminal 12.
(2) bending the second base section 132 and the second contact section 133 at the cutout 1324 to make the second base section 132 parallel to the stationary terminal 12 and the second contact section 133 overlap with the first contact section 123.

In the preferred embodiment of the present invention, the semicircular cutout 1324 will suit the change during bending the movable terminal 13. With the method of the present invention, only one die is used to pressing once, which decreases the steps in the prior art.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A switching terminal assembly comprising:
   a first terminal defining a main plane and having an elongated first base section with thereof a first retaining section at a first root region and a first contact section at a tip region wherein said first contact section essentially extends in a transverse direction with regard to a longitudinal direction of the first terminal;
   a second terminal for electrically connecting with the first terminal, being substantially parallel to the first terminal from an elevational view, said second terminal including a second retaining section at thereof a second root region, said second retaining section being coplanar with the first retaining section, an elongated transfiguration section connected to the second retaining section, and a pressing portion at a distal end of the second terminal,
   a tip section of the pressing portion being essentially located at a same level with the first contact section, said pressing portion being offset from said main plane from a side view, wherein
   a cutout is formed in an inner edge of said second terminal, facing the first terminal, portions of said second terminal around said cutout experience deformation due to rotation of said second terminal about said cutout so as to allow the tip section of the pressing portion and the first contact section to be overlapped with each other from the elevational view.

2. The assembly as claimed in claim 1, wherein both the first retaining section and the second retaining section are linked to a same carrier strip in a coplanar manner.

3. A switching terminal assembly comprising:
   a carrier strip;
   a first terminal extending from an edge of the carrier strip, and comprising a first base portion with thereof a first retaining section at a first root region and a first contact section formed in a first plane and extending perpendicularly from the first base section; and
   a second terminal extending from the edge of the carrier strip, comprising a second retaining section being substantially parallel to the first retaining section of the first terminal, a transfiguration section extending from the retaining section with a second contact section at a second root region thereof; wherein
   said second terminal has a cutout defined in an inner edge thereof and facing the first terminal, portions of said second terminal around said cutout experience deformation due to rotation of said second terminal about said cutout so as to allow a tip of the second contact section and the first contact section to be overlapped with each other from an elevational view.

4. The switching terminal assembly as claimed in claim 3, wherein the transfiguration section includes a pressing portion being offset from said first plane from a side view.

5. The switching terminal assembly as claimed in claim 4, wherein the second terminal further includes an angled portion connected to the transfiguration section and equipped with a U-shape configuration between the pressing portion and the second retaining section along a lengthwise direction of the second terminal, wherein the angled portion is open toward an inner edge of the first base portion.

6. The switching terminal assembly as claimed in claim 4, wherein the second terminal further includes an angled portion and equipped with a U-shape configuration between the pressing portion and the second retaining section along a lengthwise direction of the second terminal, wherein the angled portion and the cutout are open toward a same direction.

7. The switching terminal assembly as claimed in claim 3, wherein the first retaining section is narrower than the first base section.

8. The switching terminal assembly as claimed in claim 4, wherein said tip of the second contact section is located below of the first contact section from a platform view, and the pressing portion of the second terminal is of arc configuration with a tip of arc configuration being away from the first contact section of the first terminal.

9. The switching terminal assembly as claimed in claim 3, wherein the second terminal further defines an angled section connected to the transfiguration portion and laterally offset from the second retaining section, and said angled section is spaced away from the cutout in a longitudinal direction of said second retaining section.

10. A switching terminal assembly comprising:
    a carrier strip;
    a first terminal extending from one edge of said carrier strip and defining a main plane and having an elongated first base section, a first retaining section at a first root region thereof, and a first contact section at a tip region thereof, wherein said first contact section essentially extends in a transverse direction with regards to a longitudinal direction of the first terminal;
    a second terminal for electrically connecting with the first terminal, extending from said edge substantially parallel to the first terminal from an elevational view, said second terminal including a second retaining section at a second root region thereof, said second retaining section being coplanar with the first retaining section, an elongated transfiguration section connected to the second retaining section, an angled portion connected to the transfiguration section, and a pressing portion connected to the angled portion; wherein
    a tip section of the pressing portion is essentially located at a same level with the first contact section, and said pressing portion is offset from said main plane from a side view, wherein
    a cutout is formed in an inner edge of said second terminal, facing the first terminal, portions of said second terminal around said cutout experience deformation due to rotation of said second terminal about said cutout so as to allow the tip section of the pressing portion and the first contact section to be overlapped with each other from the elevational view.

11. The assembly as claimed in claim 10, wherein both the first retaining section and the second retaining section are linked to said same carrier strip in a coplanar manner.

12. The assembly as claimed in claim 10, wherein said angled portion is of a U-shaped configuration.

13. The switching terminal assembly as claimed in claim 10, wherein said tip of the second contact section is located below the first contact section from a planform view, and the pressing portion of the second terminals is of an arc configuration with a tip of said arc configuration being away from the first contact section of the first terminal.

14. The switching terminal assembly as claimed in claim 10, wherein the angled section is laterally offset from the second retaining section, and said angled section is spaced away from the cutout in a longitudinal direction of said second retaining section.

* * * * *